United States Patent
Payne et al.

(10) Patent No.: US 9,588,989 B2
(45) Date of Patent: *Mar. 7, 2017

(54) SEARCH SYSTEMS AND COMPUTER-IMPLEMENTED SEARCH METHODS

(71) Applicant: Battelle Memorial Institute, Richland, WA (US)

(72) Inventors: Deborah A. Payne, Richland, WA (US); Edwin R. Burtner, Richland, WA (US); Shawn J. Bohn, Richland, WA (US); Shawn D. Hampton, Kennewick, WA (US); David S. Gillen, Kennewick, WA (US); Michael J. Henry, Pasco, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/977,452

(22) Filed: Dec. 21, 2015

(65) Prior Publication Data

US 2016/0110384 A1     Apr. 21, 2016

Related U.S. Application Data

(63) Continuation of application No. 13/910,005, filed on Jun. 4, 2013, now Pat. No. 9,218,439.

(51) Int. Cl.
*G06F 17/30* (2006.01)

(52) U.S. Cl.
CPC .. *G06F 17/30247* (2013.01); *G06F 17/30038* (2013.01); *G06F 17/30598* (2013.01); *G06F 17/30991* (2013.01)

(58) Field of Classification Search
CPC .................. G06F 17/30112; G06F 17/30554
(Continued)

(56) References Cited

U.S. PATENT DOCUMENTS 6,983,287 B1 *  1/2006  Jayanti .............. G06F 17/30038
8,391,618 B1 *  3/2013  Chuang ............ G06F 17/30247
                                                       382/224

(Continued)

OTHER PUBLICATIONS

Andrews et al., "Space to Think: Large, High-Resolution Displays for Sensemaking", Computer-Human Interaction, Apr. 10-15, 2010, United States, pp. 55-64.

(Continued)

*Primary Examiner* — Noosha Arjomandi
(74) *Attorney, Agent, or Firm* — Wells St. John P.S.

(57) ABSTRACT

Search systems and computer-implemented search methods are described. In one aspect, a search system includes a communications interface configured to access a plurality of data items of a collection, wherein the data items include a plurality of image objects individually comprising image data utilized to generate an image of the respective data item. The search system may include processing circuitry coupled with the communications interface and configured to process the image data of the data items of the collection to identify a plurality of image content facets which are indicative of image content contained within the images and to associate the image objects with the image content facets and a display coupled with the processing circuitry and configured to depict the image objects associated with the image content facets.

13 Claims, 7 Drawing Sheets

(58) Field of Classification Search
USPC .......................................................... 707/722
See application file for complete search history.

(56) References Cited

U.S. PATENT DOCUMENTS

| | | | |
|---|---|---|---|
| 9,170,574 B2* | 10/2015 | Fuller | G05B 15/02 |
| 9,198,010 B2* | 11/2015 | Aldecoa | H04W 4/02 |
| 2002/0059282 A1* | 5/2002 | Andersson | G05B 15/02 |
| 2005/0049988 A1* | 3/2005 | Dahlquist | G05B 23/0278 706/46 |
| 2008/0115083 A1* | 5/2008 | Finkelstein | G06F 17/30 715/805 |
| 2009/0234864 A1 | 9/2009 | Ellis et al. | |
| 2010/0223276 A1 | 9/2010 | Al-Shameri et al. | |
| 2011/0125764 A1 | 5/2011 | Carmen et al. | |
| 2011/0131210 A1 | 6/2011 | Bierner | |
| 2011/0313927 A1* | 12/2011 | Savilia | G06Q 30/0633 705/50 |
| 2012/0203766 A1 | 8/2012 | Hornkvist et al. | |
| 2012/0278321 A1 | 11/2012 | Traub et al. | |
| 2012/0296745 A1* | 11/2012 | Harper | G06Q 30/02 705/14.64 |
| 2013/0084001 A1* | 4/2013 | Bhardwaj | G06Q 30/0643 382/165 |
| 2013/0156323 A1 | 6/2013 | Yates et al. | |
| 2013/0179450 A1 | 7/2013 | Chitiveli | |
| 2013/0238663 A1 | 9/2013 | Mead et al. | |
| 2013/0311881 A1 | 11/2013 | Birnbaum et al. | |
| 2013/0339311 A1 | 12/2013 | Ferrari et al. | |
| 2013/0339379 A1 | 12/2013 | Ferrari et al. | |
| 2014/0032518 A1 | 1/2014 | Cohen et al. | |
| 2014/0279283 A1 | 9/2014 | Budaraju et al. | |
| 2014/0358902 A1 | 12/2014 | Hornkvist et al. | |
| 2015/0039611 A1 | 2/2015 | Deshpande et al. | |
| 2015/0088923 A1* | 3/2015 | Garcia-Barrio | G06F 17/30401 707/769 |
| 2016/0110384 A1* | 4/2016 | Payne | G06F 17/30991 707/722 |

OTHER PUBLICATIONS

Arevalillo-Herraez et al., "Combining Similarity Measures in Content-Based Image Retrieval", Pattern Recognition Letters 29, 2008, Netherlands, pp. 2174-2181.

Bartolini et al., "Integrating Semantic and Visual Fectes for Browsing Digital Photo Collections" 17th Italian Symposium on Advanced Database Systems, 2009, Italy, 8 pages.

Blei et al., "Latent Dirichlet Alloction", Journal of Machine Learning Research vol. 3, 2003, United States, pp. 993-1022.

Bosch at al., "Image Classification using Random Forests and Ferns", Proceedings of the 11th International Conference on Computer Vision, Oct. 14-21, 2007, Rio de Janeiro, 8 pages.

Bosch et al., "Representing Shape with a Spatial Pyramid Kernel", Proceedings of the 6th ACM International Conference on Video and Image Retrieval, Jul. 9-11, 2007, Netherlands, 8 pages.

Burtner et al., "Interactive Visual Comparison of Multimedia Data through Type-Specific Views", Visualization and Data Analysis, 2013, United States, 15 pages.

Deerwester et al., "Indexing by Latent Semantic Analysis", Journal of the American Society for Information Science vol. 41, No. 6, 1990, United States, pp. 391-407.

Dillard et al., "Coherent Image Layout using an Adaptive Visual Vocabulary", SPIE Proceedings, Electronic Imaging: Machine Vision and Applications, 2013, United States, 14 pages.

Endert et al., "The Semantics of Clustering: Analysis of User-Generated Spatializations of Text Documents", AVI, 2012, Italy, 8 pages.

Gallant et al., "HNC's MatchPlus System", ACM SIGIR Forum vol. 26, Issue 2, Fall 1992, United States, pp. 34-38.

Gilbert et al., "iGroup: Weakly Supervised Image and Video Grouping", IEEE International Conference on Computer Vision, 2011, United States, 8 pages.

Hearst, "Information Visualization for Peer Patent Examination", UC Berkeley, 2006, United States, 11 pages.

Hetzler et at "Analysis Experiences using Information Visualization", IEEE Computer Graphics and Applications vol. 24, No. 5, 2004, United States, pp. 22-26.

Hoffman, "Probabilistic Latent Semantic Indexing", Proceedings of the 22nd Annual International SIGIR Conference on Research and Development in Information Retrieval, 1999, Untied States, 8 pages.

Kramer-Smyth et al., "ArchivesZ: Visualizing Archival Collections", accessed online http://archivesz.com (Apr. 3, 2013) 10 pages.

Kules, "Mapping the Design Space of Faceted Search Interfaces", Fifth Annual Workshop on Human-Computer Interaction and Information Retrieval, 2011, United States, 2 pages.

Laniado et al., "Using WordNet to turn a Folksonomy into a Hierarchy of Concepts", Semantic Web Applications and Perspectives, 2007, Italy, 10 pages.

Lowe, "Distinctive Image Features from Scale-Invariant Keypoints", International Journal of Computer Vision, 2004, Netherlands, 28 pages.

Moghaddam et al., "Visualization and User-Modeling for Browsing Personal Photo Libraries", International Journal of Computer Vision, 2004, Netherlands, 34 pages.

Muller et al., "VisualFlemenco: Faceted Browsing for Visual Features", 9th IEEE International Symposium on Multimedia Workshops, 2007, United States, 2 pages.

Pirolli et al., "Information Foraging", UIR Technical Report, Jan. 1999, United States, 84 pages.

Rodden et al., "Evaluating a Visualization of Image Similarity as a Tool for Image Browsing", IEEE Symposium on Information Visualization, Oct. 1999, United States, 9 pages.

Rose et al., "Facets for Discovery and Exploration in Text Collections", IEEE Workshop on Interactive Visual Text Analytics for Decision Making, 2011, United States, 4 pages.

Rubner et al., "A Metric for Distributions with Applications to Image Databases", 6th IEEE International Conference on Computer Vision, 1998, United States, 8 pages.

Schaefer et al., "Image Database Navigation on a Hierarchical MDS Grid", Pattern Recognition, 2006, United Kingdom, pp. 304-313.

Shi et al., "Understanding Text Corpora with Multiple Facets", Visual Analytics Science and Technology (VAST), 2010, United States, 8 pages.

Villa et al., "A Faceted Interface for Multimedia Search", Proceedings of the 31st International ACM SIGIR Conference on Research and Development in Information Retrieval, Jul. 20-24, 2008, Singapore, pp. 775-776.

Yang et al., "Semantic Image Browser: Bridging Information Visualization with Automated Intellegent Image Analysis", Visual Analytics Science and Technology (VAST), 2006, United States, 8 pages.

Yee et al., "Faceted Metadata for Image Search and Browsing", Computer-Human Interaction, 2003, United States, 8 pages.

Zwol et al., "Faceted Exploration of Image Search Results", WWW 2010, Apr. 26-30, 2010, Raleigh, NC, pp. 961-970.

* cited by examiner

SEARCH SYSTEMS AND COMPUTER-IMPLEMENTED SEARCH METHODS

RELATED PATENT DATA

This application is a continuation of and claims priority to U.S. patent application Ser. No. 13/910,005 filed Jun. 4, 2013, titled "Search Systems and Computer-Implemented Search Methods", the teachings of which are incorporated herein by reference.

FEDERALLY-SPONSORED RESEARCH AND DEVELOPMENT

This invention was made with Government support under Contract DE-AC0576RL01830 awarded by the U.S. Department of Energy. The Government has certain rights in the invention.

TECHNICAL FIELD

The present disclosure relates to search systems and computer-implemented searching methods.

BACKGROUND OF THE DISCLOSURE

Analysts are often tasked with exploring a data collection in search of a particular item of interest or a set of items that all match given criteria. The criteria may not be known ahead of time; rather, users may benefit from having a system that can reveal the characteristics within the collection and allow them to uncover items of interest.

To help analysts explore large, complex collections, systems often employ facets to navigate classifications. Within the context of search, facets are combinations of dimensions that align with the data, enabling filtering. These facets facilitate navigation and exploration of large collections of data, reducing the set of interesting items down to a manageable set, while allowing analysts to choose the pertinent relationships among the data in the collection.

At least some embodiments of the disclosure are directed to search systems and computer-implemented search methods.

DETAILED DESCRIPTION OF THE DISCLOSURE

At least some embodiments are directed towards search apparatus, systems and methods which facilitate searching of a collection of data items including searching image content of data items. In one embodiment, faceted search systems and methods are described. More specifically, a plurality of data items to be searched are preprocessed to identify a plurality of multimedia facets including facets based upon image data of the data items which is used to generate the images. Systems and methods are also described for interacting and searching the data items based upon the image data of the data items.

Figure 1:
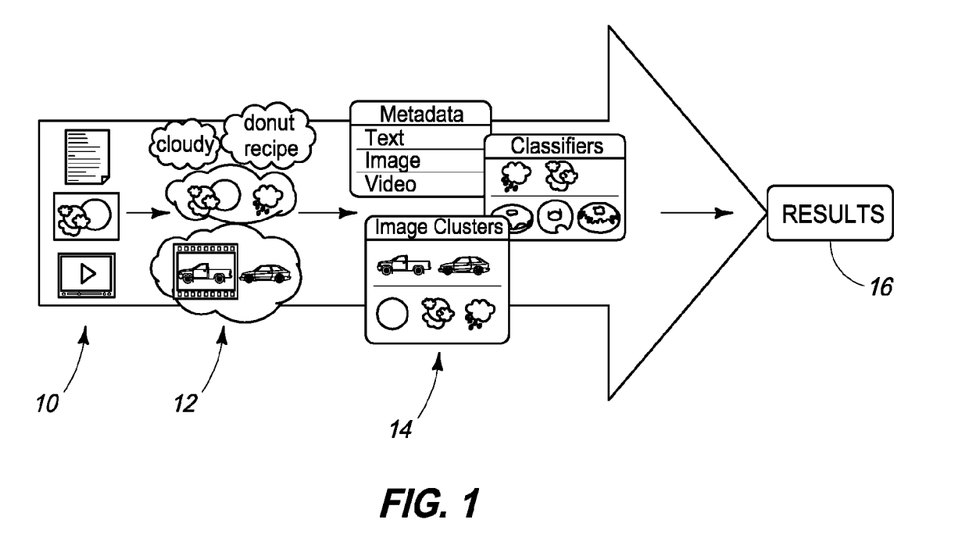
FIG. 1 is a high-level illustrative representation of a method of processing a collection of data items according to one embodiment.

A collection of data items 10 are accessed by a searching system described in additional below. For example, the searching system may be implemented using a server and the data items 10 may be uploaded from a hard drive or network share in illustrative examples.

The data items 10, such as documents, may be either simple or compound. Simple data items include a single modality of data content, such as plain text or images (e.g., txt files, jpg files, gif files, etc.). The data content of a simple data item including a single modality of data content may be referred to as a base object 12 or a base element. Compound data items include a set of base objects 12 of different modalities. For example, word processing documents (e.g., Word) and PDF documents may contain images and text which are each a base object 12 (either a text object or image object) in one embodiment. Furthermore, a shot may be identified from a contiguous set of frames of a video that have similar content. A single key frame of this shot may also be utilized as an image object for each of the shots in the video in one embodiment. The base objects 12 are similarly processed regardless of whether they originated within a simple or compound data item. In one embodiment, audio files may be converted to text files using appropriate conversion software and processed as text objects.

An original compound data item may be referred to as a "parent" and each of the base objects 12 extracted from the data item may be referred to as a "child." Children base objects 12 which co-occur within and are extracted from the same compound data item are referred to as "siblings."

In one embodiment, the data items 10 are processed to identify and extract the base objects 12 within the data items 10. In one example, metadata of the data items 10 is collected and stored. Text data is analyzed with a text engine while image and video data are analyzed using a content analysis engine.

There are several varieties of text engines that may be used in example embodiments. Text engines are a superclass to search engines given the tasks they are able to perform. Text engines not only provide the capability to perform text searches but also provide representations to enable exploration through the content of the text they have ingested. Accordingly, text engines may perform standard Boolean and Query-by-Example searches, with various ranking output, and additionally enable use in visualization and relationship exploitation within the content. In one embodiment, the Apache Lucene text search engine (http://lucene.apache.org/core/) is used as a platform for ingesting, indexing and characterizing content and has strong indexing and text characterization components. The In-SPIRE text engine (http://in-spire.pnnl.gov/index.stm), incorporates all these capabilities and the ability to exploit semantic or at least term-to-term relationship between content, as well as the descriptive and discrimination term/topic label models that enable exploration and explanation. Details of the In-SPIRE text engine are discussed in Hetzler, E. and Turner, A. "Analysis experiences using information visualization," IEEE Computer Graphics and Applications, 24(5):22-26 (2004), the teachings of which are incorporated herein by reference.

The techniques to characterize content, which lie at the heart of a text engines' representation, is also varied within the literature. Example techniques include Latent Semantic Indexing which is discussed in Deerwester, S., Dumais, S., Furnas, G., Landauer, T., Harshman, R. "Indexing by latent semantic analysis", 1990 Journal of the American Society for Information Science, HNC's MatchPlus—learned vector-space models discussed in Gallant, S., Caid, W., Carleton, J., Hecht-Nielsen, R., Quig, K., Sudbeck, D., "HNC's MatchPlus system", ACM SIGIR Forum, Vol. 26. Issue 2, Fall 1992, Pg 34-38, and variants which include Probabilistic Latent Semantic Indexing discussed in Blei, D., Ng, A., Jordan, M., "Latent dirichlet allocation", Journal of Machine Learning Research, Vol. 3, pg 993-1022, Mar. 1, 2003, and Latent dirichlet allocation discussed in Hofmann, T., "Probabilistic latent semantic indexing", Proceedings of the $22^{nd}$ annual international ACM SIGIR conference on Research and development in information retrieval, pg 50-57, New York, N.Y., 1999, the teachings of all of which are incorporated herein by reference. These algorithms and their mathematic representations combined with the capabilities of a search index describe an example text engine which may be utilized in one embodiment.

The image content analysis engine provides image retrieval characteristics within image and video data through characterization and decision-support processes. One example content analysis engine process leverages the bag-of-features model for image content analysis and uses features such as color, SIFT described in D. G. Lowe, "Distinctive Image Features From Scale-Invariant Keypoints," In International Journal of Computer Vision, 2004; Dense SIFT described in A. Bosch, A. Zisserman, and X. Munoz, "Image Classification Using Random Forests and Ferns, In Proceedings of the 11th International Conference on Computer Vision, 200; 7 and Pyramid Histogram of Orientation Gradients described in A. Bosch, A. Zisserman, and X. Munoz, "Representing Shape With A Spatial Pyramid Kernel," In Proceedings of the 6th ACM International Conference on Image and Video Retrieval, 2007, the teachings of which are incorporated herein by reference.

In one embodiment, multiple content-based features are computed for each image in the collection by the content analysis engine. Two images in the collection are compared by first computing a pair-wise comparison of each feature across the two images, and then combining the results of the pair-wise feature comparisons using teachings of Arevalilo-Herraez, Domingo, Ferri, Combining Similarity Measures in Content-Based Image Retrieval Pattern Recognition Letters 2008, the teachings of which are incorporated herein by reference.

The base objects 12 are processed to identify a plurality of facets 14 in one embodiment. Facets can be used for searching and browsing relatively large text and image collections. While each data modality (i.e., data type) can be explored on its own, many data items contains a mix of multiple modalities, for example, a PDF file may contain both text and images. Providing a browsing interface for multiple data types in accordance with an aspect of the disclosure enables an analyst to make connections across the multiple types present in a mixed media collection.

A facet 14 represents a single aspect or feature of a base object and typically has multiple possible values. As described further below, facets are generated based upon image data as well as text content providing categories for both text/metadata and content-based image retrieval characteristics in one embodiment. Example facets include author, location, color, and diagram.

As discussed further below, facets may be visualized by a single column of values, each value being defined as a facet attribute which represent a set of unique identifiers for the objects that have the particular aspect represented by the attribute. The facets and facet attributes may be grouped into facet categories, such as general (metadata) and images, in one embodiment.

In one embodiment, the visual representation of a facet attribute is determined by the facet category. Metadata categories are shown as text where content based image retrieval categories are visualized by a set of exemplar images of the base objects contained in the attribute. Furthermore, facet attributes in both general and images facet categories include counts of the numbers of base objects associated with the facet attributes in one embodiment.

Facets within the general category are collected from all data items including text objects and image objects and include metadata information in the described example, such as author, last author, location, camera make, camera model, f-stop information, etc. Content-based image retrieval facets derive features based on image similarity, such as color and diagram. In one embodiment, the general category facets are collected during processing and the user may select which of the general category facets are visible in the user interface.

The image data of image objects which is utilized to generate images is used to construct one or more image content facets and respective facet attributes thereof in one embodiment. For example, image cluster, color and classifier image content facets are constructed from the processing of images and shots. The image content facets are precalculated during processing and the user may select which of these facets are visible in the user interface in one embodiment.

The facet attributes of the image cluster facet are the resulting clusters of image objects found by performing k-means processing on the collection of image objects (e.g., images and shots) in one embodiment. Each facet attribute represents a cluster of images, thereby facilitating exploration of the collection of data items when the content of that collection is not known ahead of time. The facet attributes of the image cluster facet are precalculated during processing and the user may select which of these attributes are visible in the user interface in one embodiment.

The facet attributes of the color facet are based on the dominant color of each image in one embodiment. Accordingly, different facet attributes are associated with different image objects according to the different dominant colors of the image objects in one embodiment. The facet attributes of the color facet are precalculated during processing and the user may select whether or not this facet is visible in the user interface in one embodiment.

The facet attributes of the classifiers facet correspond to classification results which are constructed from image classifiers trained offline using training images. For example, classifiers can be trained to detect a number of different desired objects in images and shots, such as cars, trains, donuts, diagrams and charts using images of the objects. In example embodiments, the training images or shots may be independent of the data collection being analyzed and/or a subset of images or shots from the data collection. In one embodiment, support vector machine classifiers may be utilized. Facets built upon object classifiers are helpful when the user knows ahead of time what type of information they are interested in and configure the system to use prebuilt facets that specifically target an object of interest in one embodiment. A plurality of image classifiers may process the images and a user can select whether or not to display any of the resulting attributes of the classifier facet in the user interface in one embodiment.

A user can select the facets and facet attributes to be utilized for searching operations following the identification of the facets and facet attributes, perhaps after associations of the text objects and image objects with the facets and facet attributes. Selections are managed as a set of unique numerical identifiers which are keys to a row of a database (e.g., maintained within the storage circuitry). In one embodiment, when a specific facet attribute is selected within a facet (e.g., example attributes include text, shots, videos, documents, and images of a media type facet), the set of identifiers for that facet attribute is stored and a notification is sent to the other facets in facet categories which in turn notify the contained facet attributes of the new set of identifiers. The attributes then show the base objects which exist in the intersection of the given set with their own set of base objects. Their counts are updated to reflect the base objects contained in the intersection. If a count is zero, the entire facet attribute is collapsed in one embodiment to show that there is no overlap. As another selection is made, the sets of selected objects are joined together with a union operator and all facets are notified of this union. A union will potentially reduce the counts of objects contained in the facets. Additionally, a user can deselect one or more of the facet attributes which causes the system to recompute the union of selected sets and resend the notification to each of the facets.

The results 16 of the processing of the collection of data items may be displayed and interacted with by a user as mentioned above. The base objects of the data items may be displayed arranged according to the generated facets and facet attributes as discussed further below. As mentioned above, the user can select one or more facet attributes and the results 16 may be modified to show the base objects which include the selected facet attribute(s). The user may select individual base objects for viewing, such as text, images or video clips corresponding to selected shots in one embodiment.

Figure 2:
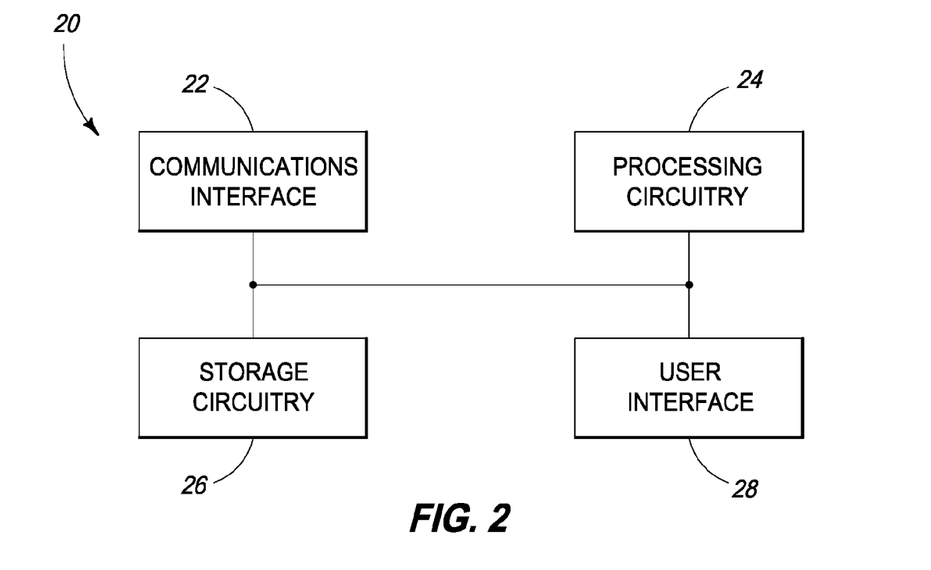
FIG. 2 is a functional block diagram of a search system according to one embodiment.

Referring to FIG. 2, one embodiment of a search system 20 is shown. The search system 20 may be implemented within one or more computer system, such as a server, in one embodiment. The illustrated example includes a communications interface 22, processing circuitry 24, storage circuitry 26 and a user interface 28. Other embodiments are possible including more, less and/or alternative components.

Communications interface 22 is arranged to implement communications of search system 20 with respect to external devices or networks (not shown). For example, communications interface 22 may be arranged to communicate information bi-directionally with respect to search system 20. Communications interface 22 may be implemented as a network interface card (NIC), serial or parallel connection, USB port, Firewire interface, flash memory interface, or any other suitable arrangement for implementing communications with respect to search system 20. Communications interface 22 may access data items of a collection from any suitable source, such as the web, one or more web site, a hard drive, etc.

In one embodiment, processing circuitry 24 is arranged to process data, control data access and storage, issue commands, and control other desired operations. Processing circuitry 24 may comprise circuitry configured to implement desired programming provided by appropriate computer-readable storage media in at least one embodiment. For example, the processing circuitry 24 may be implemented as one or more processor(s) and/or other structure configured to execute executable instructions including, for example, software and/or firmware instructions. Other exemplary embodiments of processing circuitry 24 include hardware logic, PGA, FPGA, ASIC, state machines, and/or other structures alone or in combination with one or more processor(s). These examples of processing circuitry 24 are for illustration and other configurations are possible.

Storage circuitry 26 is configured to store programming such as executable code or instructions (e.g., software and/or firmware), electronic data, databases, image data, or other digital information and may include computer-readable storage media. At least some embodiments or aspects described herein may be implemented using programming stored within one or more computer-readable storage medium of storage circuitry 26 and configured to control appropriate processing circuitry 24.

The computer-readable storage medium may be embodied in one or more articles of manufacture which can contain, store, or maintain programming, data and/or digital information for use by or in connection with an instruction execution system including processing circuitry 24 in the exemplary embodiment. For example, exemplary computer-readable storage media may be non-transitory and include any one of physical media such as electronic, magnetic, optical, electromagnetic, infrared or semiconductor media. Some more specific examples of computer-readable storage media include, but are not limited to, a portable magnetic computer diskette, such as a floppy diskette, a zip disk, a hard drive, random access memory, read only memory, flash memory, cache memory, and/or other configurations capable of storing programming, data, or other digital information.

User interface 28 is configured to interact with a user including conveying data to a user (e.g., displaying visual images for observation by the user) as well as receiving inputs from the user. User interface 28 is configured as graphical user interface (GUI) in one embodiment. User interface 28 may be configured differently in other embodiments. User interface 28 may display screenshots discussed below.

Figure 3:
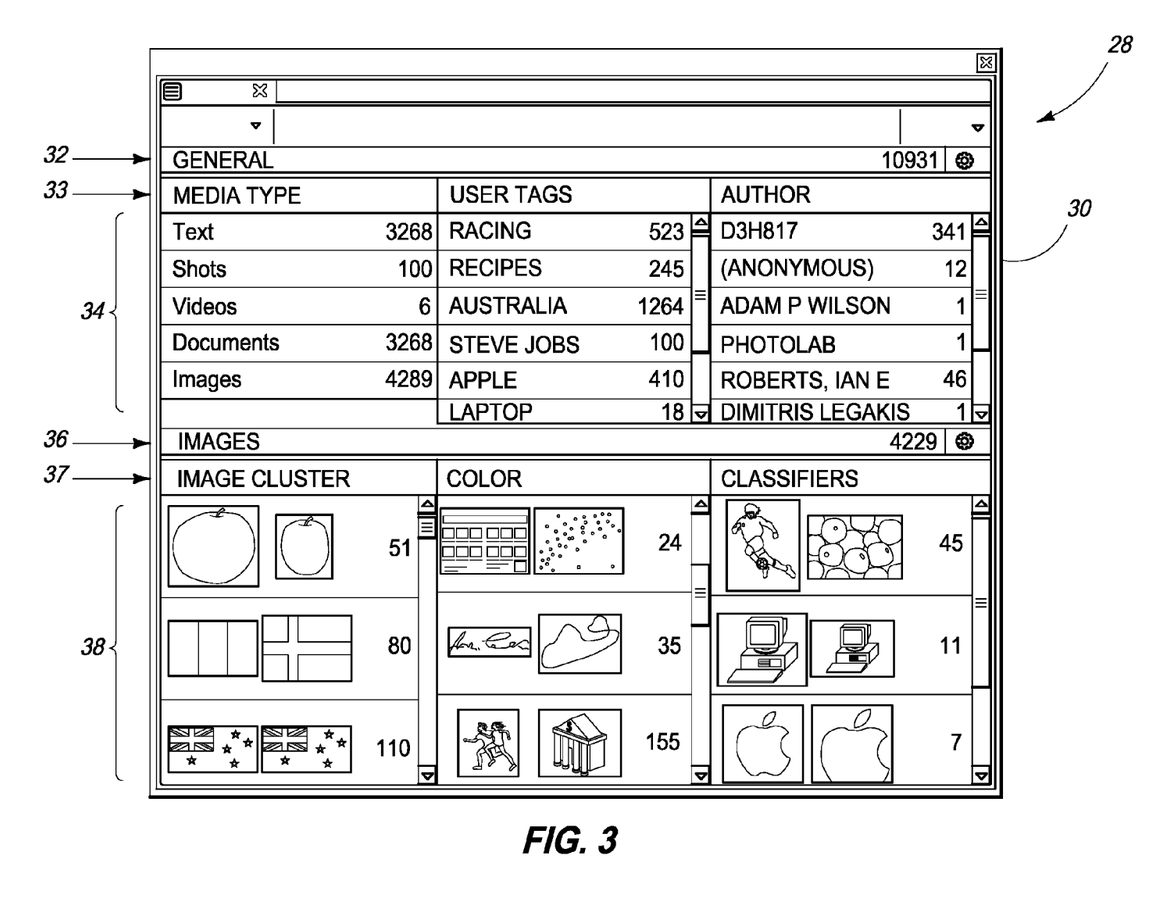
FIGS. 3-3D are screenshots which are displayed during a search of a collection of data items according to one embodiment.

Referring to FIG. 3, a screen shot 30 of one possible user interface 28 is shown. The illustrated screen shot 30 shows the results of processing of an example set of data items for discussion purposes. The data items 10 have been processed to identify facets and facet attributes and the base objects of the data items 10 may be arranged according to the identified facets and facet attributes in one embodiment. In one embodiment, a visual analytic software suite Canopy™ available from Pacific Northwest National Laboratory in Richland, Wash. and the assignee of the present application is utilized to generate the screen shots and perform other functions.

In the example embodiment shown in FIG. 3, the data items are displayed in a three-level hierarchy including facet categories 32, 36, facets 33, 37 and facet attributes 34, 38. The facet categories 32, 36, facets 33, 37 and facet attributes 34, 38 may be selected or de-selected by the user following processing of the base objects in one embodiment.

Facet category 32 is a general category (e.g., metadata) and facets 33 and facet attributes 34 are built from text, such as metadata, of the base objects which include text. Facet category 36 is an images category and facets 37 and facet attributes 38 are built from image data of the base objects which are images or shots from videos, collectively referred to as image objects. Image data of the image objects is utilized by processing circuitry to generate images of the image objects and may include data regarding, for example, color, intensity, gradients, features, etc. of the images. The individual facet attributes 34, 38 show the numbers of base objects present in each of the respective attributes. Facets 33 and facet attributes 34 may be referred to as text facets and text facet attributes while facets 37 and facet attributes 38 may be referred to as image content facets and image content facet attributes in the described example. Text facets and attributes 33, 34 are indicative of text content of the text objects and image content facets and attributes 37, 38 are indicative of image data of the image objects. In one embodiment, the text facets and attributes 33, 34 and associated base objects are simultaneously displayed in a first group of the screen shot 30 corresponding to the first facet category 32 along with image content facets and attributes 37, 38 and associated base objects which are displayed in a second group of the screen shot 30 corresponding to the second facet category 36.

Some of the base objects may be simultaneously displayed in both groups of the screen shot 30 which may facilitate searching by the analyst interacting with the search results. For example, if an image content facet attribute is selected, the selected base objects which are associated with the selected attribute may be displayed associated with appropriate text facets and attributes as well as the selected image content facet attribute.

Figure 3A:
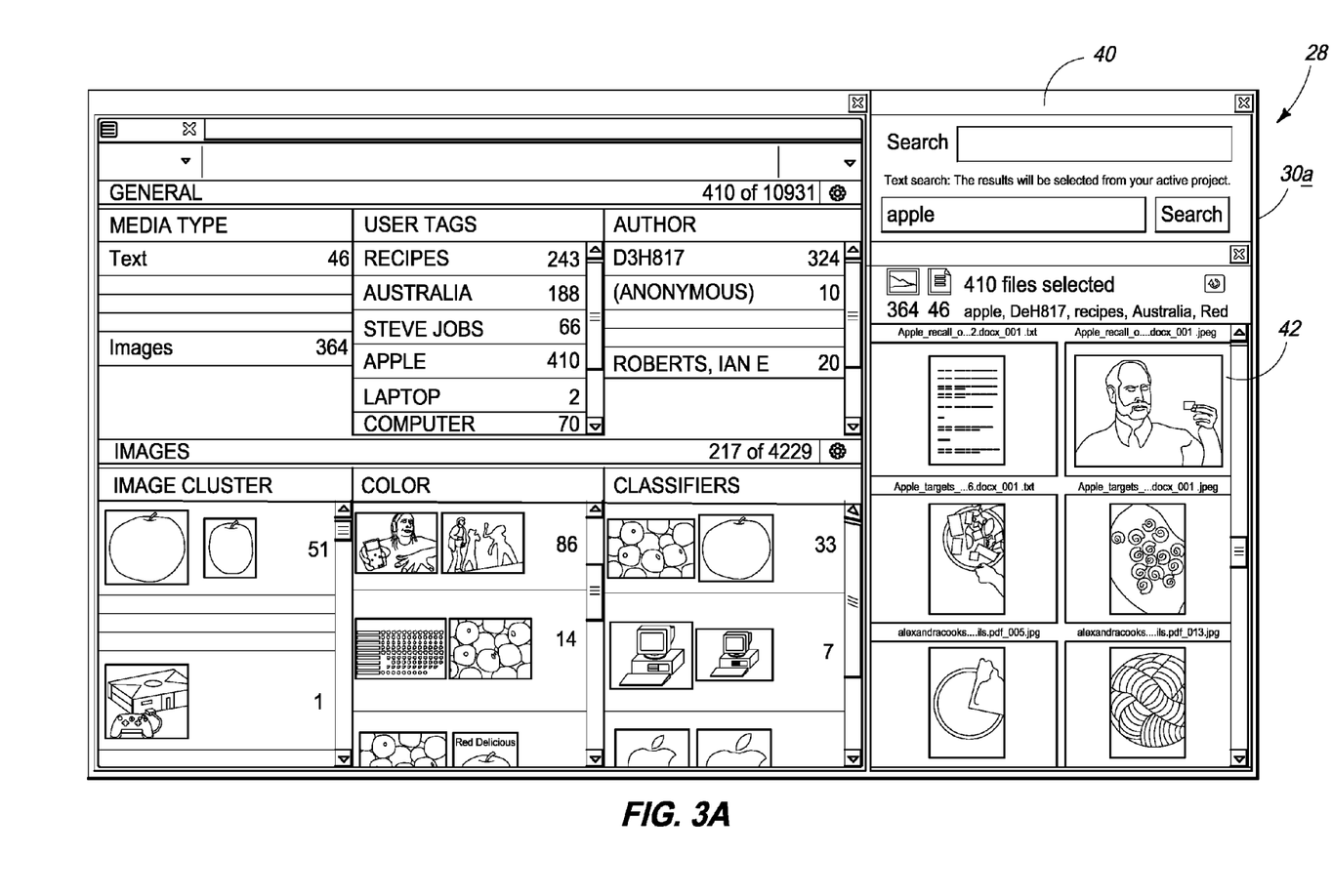

Referring to FIG. 3A, screen shot 30a reveals that the user has enabled a search window 40 which permits the user to enter text items (e.g., words) to search the collection. In one illustrative example, the user inputs the text item "apple." As a result of the entry, the search system computes the intersection or union of the base objects within the collection which include the text input search item or term.

In one embodiment, the search system also includes image objects in the results which co-occur in data items (i.e., are siblings of) with text objects which include the searched text item "apple." Accordingly, the results of the text search include text and image objects in this example. The results will include text objects which include the text "apple" (e.g., documents), image objects which include the text "apple," for example in metadata thereof, and image objects which co-occur in a data item with text and/or image objects which include the text "apple" in one more specific embodiment.

The results of all base objects including the text "apple" and co-occurring image objects are shown in the selection window 42. The names of the base objects and thumbnails of the base objects are shown in selection window 42 in the illustrated embodiment. 410 base objects are included in the search results of the selection window 42 in FIG. 3A. A comparison of FIGS. 3 and 3A shows that facets and/or facet attributes may be collapsed and not shown in the user interface 28 if the base objects remaining after the searching do not have the features or values of the collapsed facets or facet attributes.

Figure 3B:
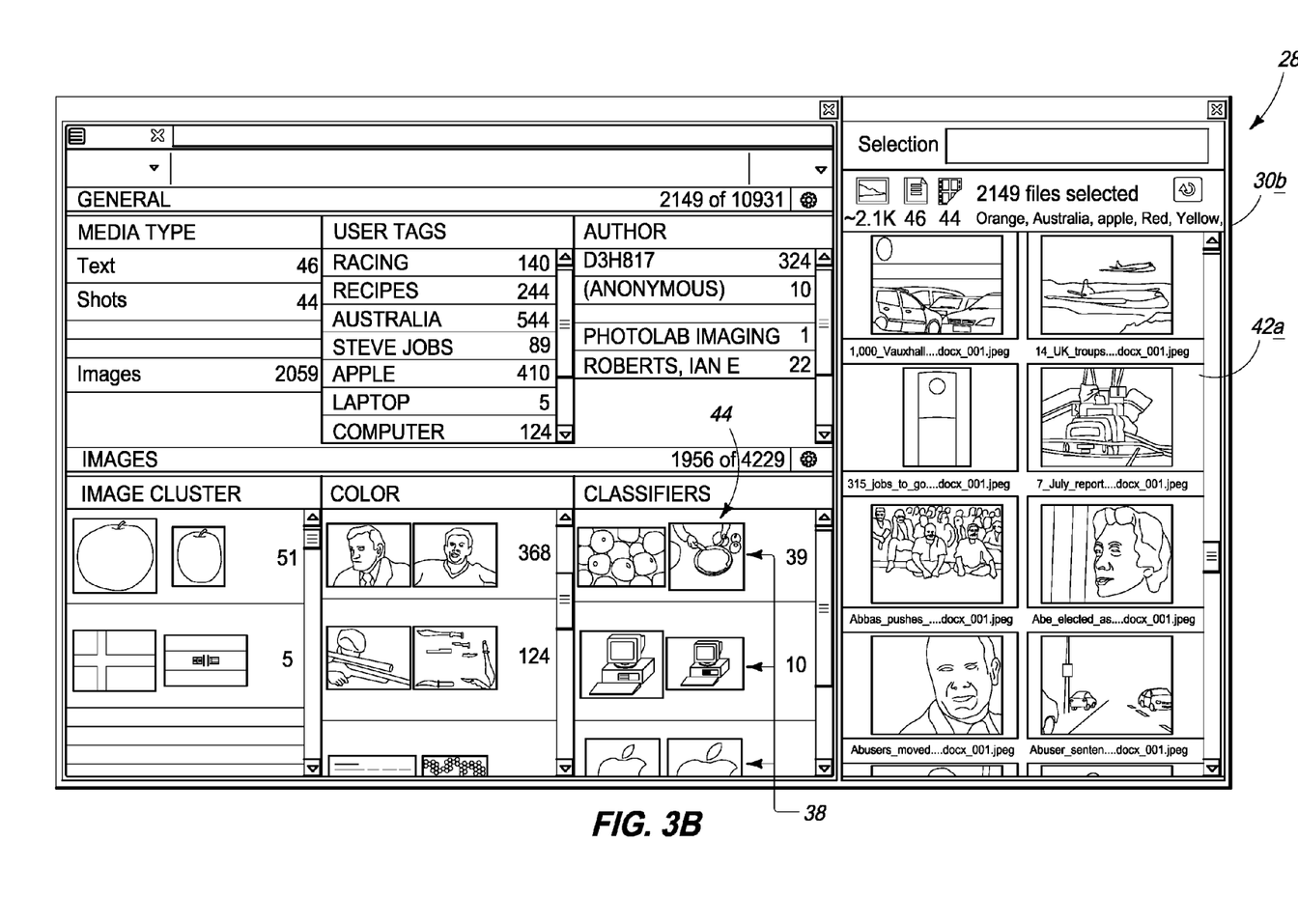

Referring to FIG. 3B, screen shot 30b reveals that the user has selected an option to select image objects from the original collection of base objects that are visually related or similar to the image objects present in the results shown in screen shot 30a of FIG. 3A which resulted from the text search.

In one embodiment, an image grid feature of the Canopy™ visual analytic software may be utilized to locate additional image objects which are visually related to the image objects present in the results of FIG. 3A. Similar images may be located using content-based image retrieval, where low-level features (e.g., SIFT) are used to determine similarity between images, in one embodiment. The number of base objects included in the search results of the selection window 42a in FIG. 3A has increased from 410 to 2149 in this illustrated example to include the image objects which are visually similar to the image objects uncovered from the text search.

This feature of expanding the search results to include images which are visually similar to the initial images assists analysts with exploring unknown pieces of a data set. This type of guided exploration is well-suited to faceted browsing and this example feature can be used to provide greater insight into the multimedia collection. For example, as discussed further in this example, the searching systems and methods may be utilized to identify base objects of interest which do not include text search terms of interest.

Figure 3C:
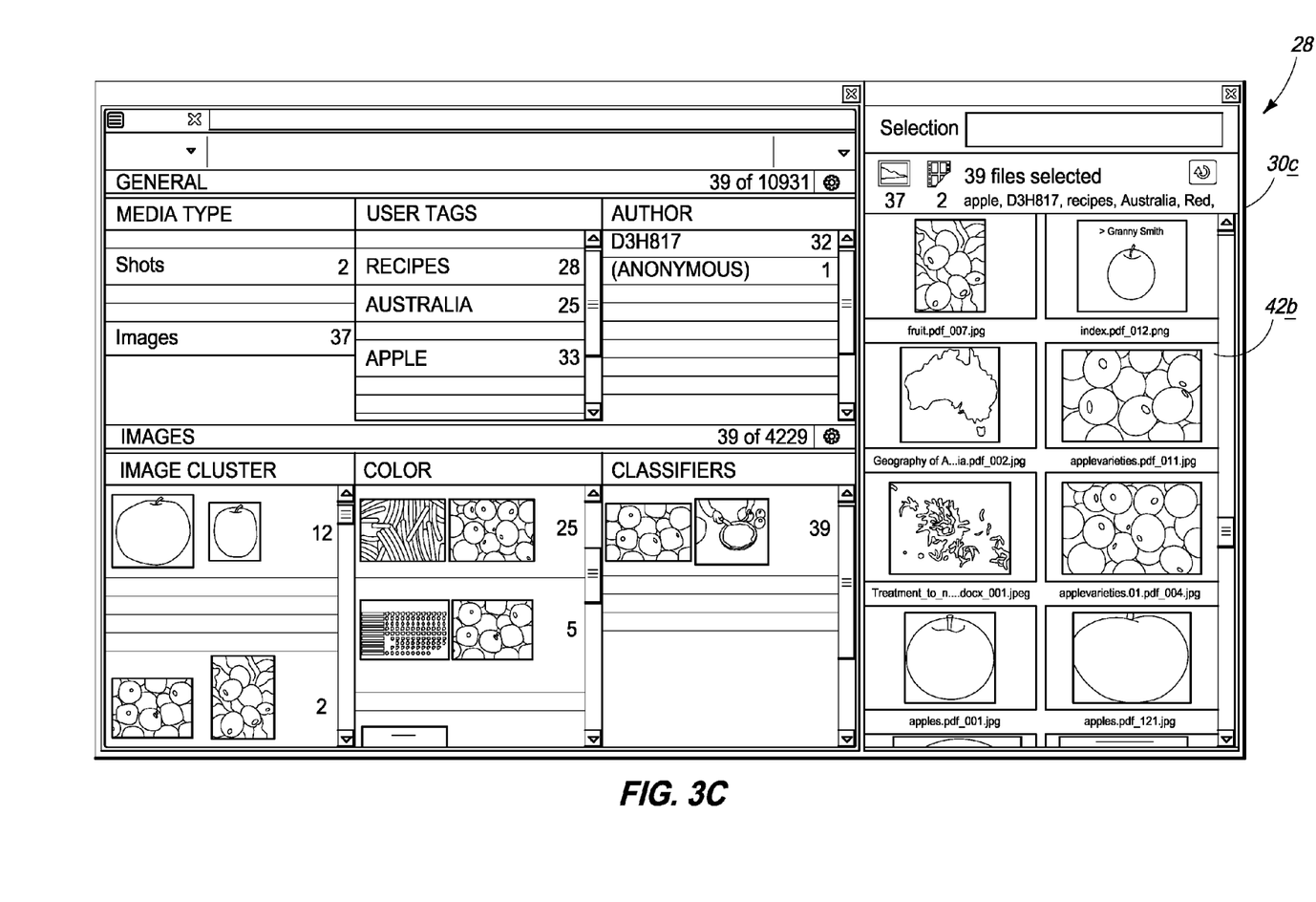

Referring to FIG. 3C, screen shot 30c reveals that the analyst has selected the results of the classifier indicated in the first row of column 44. In one exploration example, the analyst may select a facet or facet attribute of interest to further refine and explore the search results to provide a manageable set of base objects. In the depicted example, the classifier was previously trained to find images of apples and the results of the processing of the data items by the classifier is shown as the facet attributes 38 in column 44.

This selected facet attribute contained 39 base objects which were identified by the image classifier as being apples and which now populate selection window 42b. Furthermore, the results shown in screen shot 30c include a "shots" facet attribute in column 46 which includes two base objects.

Figure 3D:
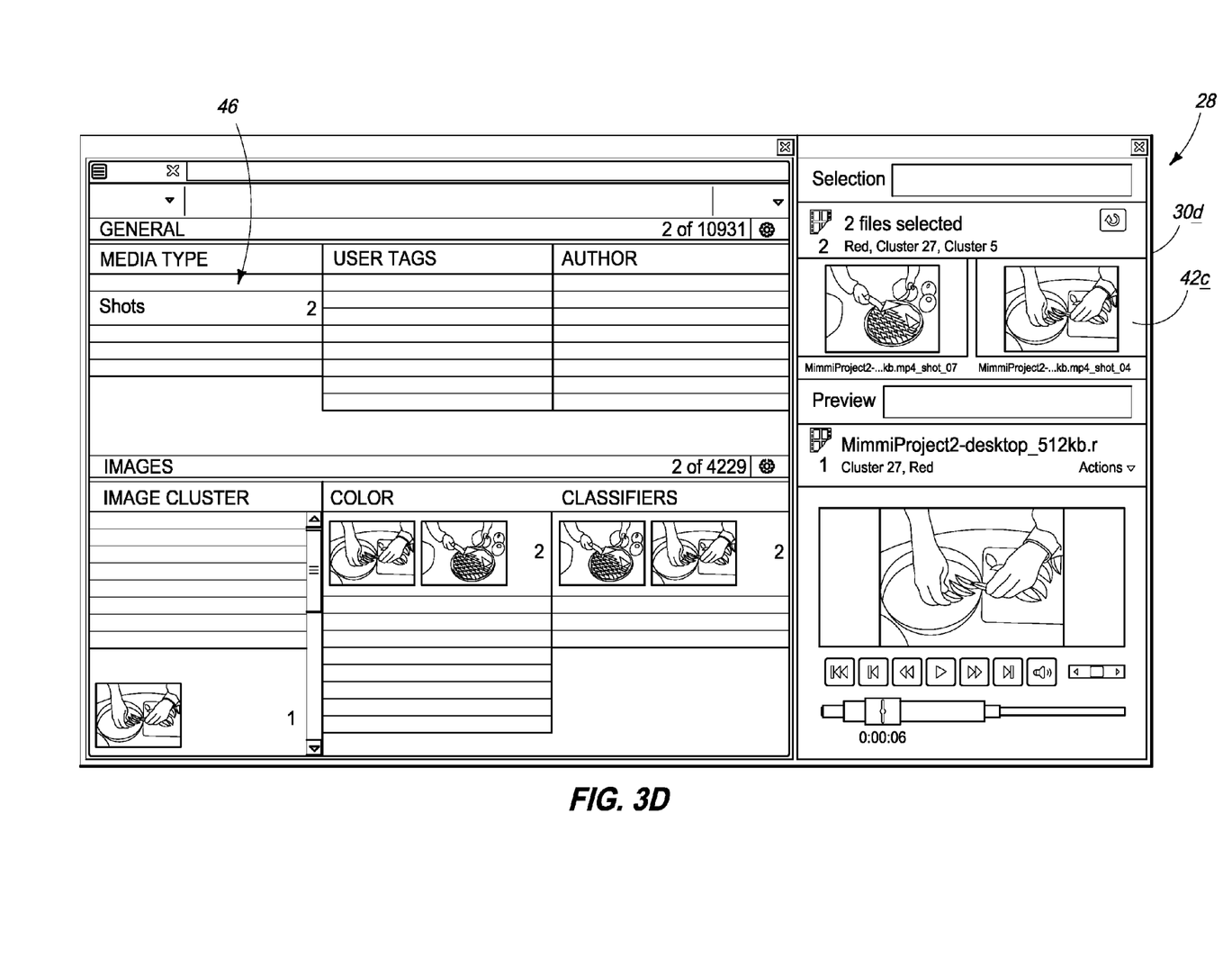

Referring to FIG. 3D, screen shot 30d reveals that the analyst has selected the "shots" facet attribute in column 46 and the selection window 42c includes the two base objects which are key frames of shots of respective videos. The analyst may select the base objects to watch the respective videos during their search of the collection of data items.

In this illustrative example, although an analyst may have a specific target in mind, such as apples, the image object shots uncovered in FIG. 3D were found even though the image objects did not include the text item which was searched "apple." Accordingly, the use of co-occurrence of base objects (i.e., parent/children/sibling relationships), the use of image content facets and facet attributes, the use of visual similarity of image objects, and the use of simultaneous display of groups of different categories of facets assisted the analyst with locating base objects of interest which did not include items of text which were searched as well as facilitating searching across different types of multimedia objects.

Figure 4:
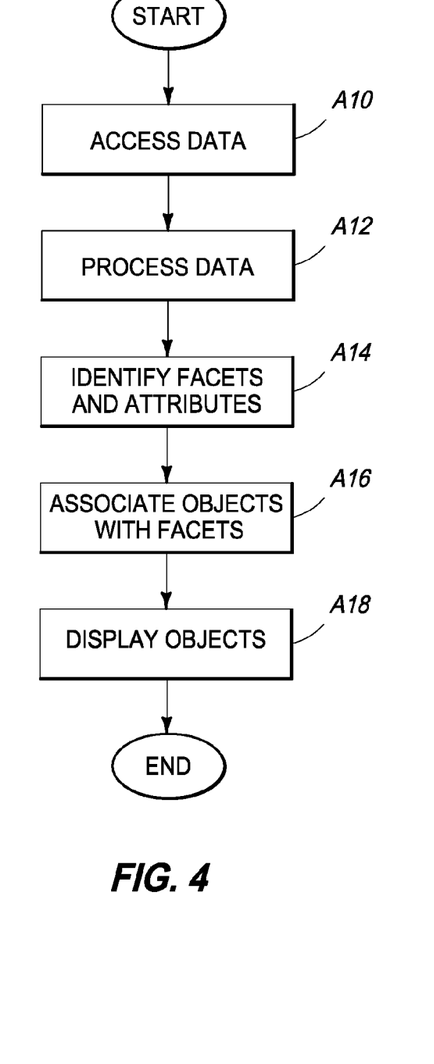
FIG. 4 is a flow chart of a method of processing a collection of data items according to one embodiment.

Referring to FIG. 4, a method of processing a collection of data items is shown according to one embodiment. The illustrated method may be performed by processing circuitry 24 in one embodiment. Other methods are possible including more, less and/or alternative acts.

At an act A10, a plurality of data items of a data collection are accessed. The data items may be simple or compound multimedia data items including text, image, video, and/or audio data in one embodiment.

At an act A12, the data items are processed. For example, compound data items may be separated into different base objects including different image objects and/or text objects.

At an act A14, a plurality of facets and facet attributes are identified using the processed data items. The facets and facet attributes may include text facets and attributes and image content facets and attributes in one embodiment.

At an act A16, the text objects and image objects are associated with the text and image content facets and facet attributes. For example, text objects which include a text item provided by a user, image objects which co-occur with the text objects, and additional image objects which are visually similar to the co-occurring image objects are associated with the text and image content facets and facet attributes in one embodiment.

At an act A18, the text and image objects are displayed with respect to the text and image content facets and facet attributes. In one embodiment, the text and image content facets and facet attributes may be depicted in respective different groups, for example as shown in FIGS. 3-3D.

Figure 5:
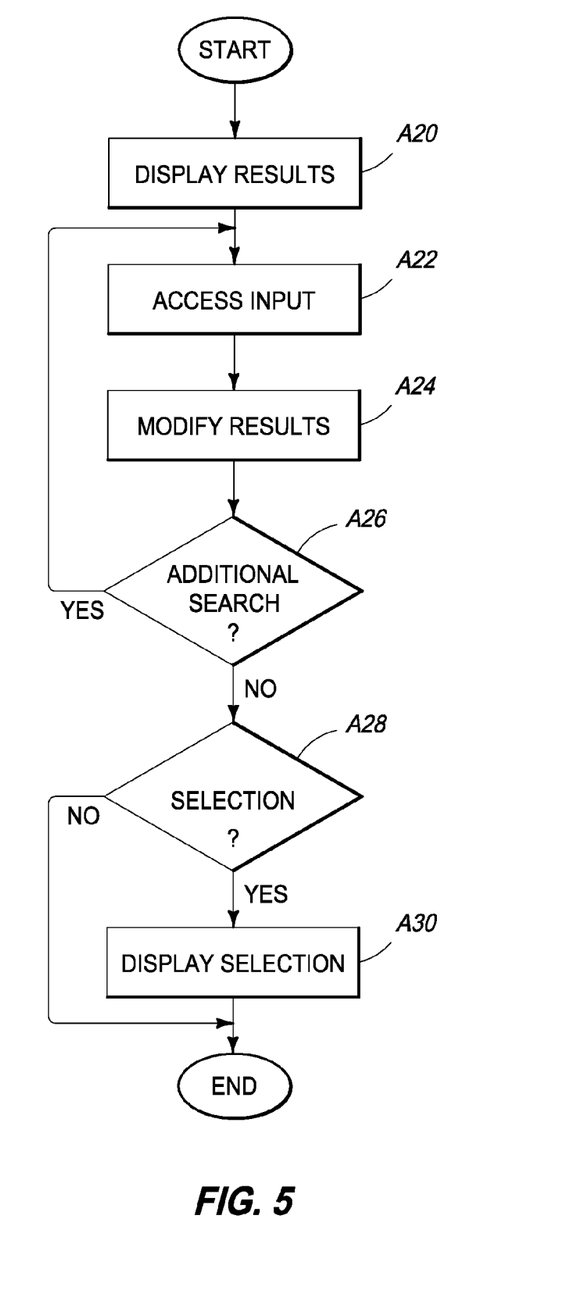
FIG. 5 is a flow chart of a method of a search of a collection of data items according to one embodiment.

Referring to FIG. 5, a method processing user inputs is shown according to one embodiment. The illustrated method may be performed by processing circuitry 24 in one embodiment. Other methods are possible including more, less and/or alternative acts.

At an act A20, the results of processing the data items of a collection are displayed. For example, the text and image objects of the data items are displayed with respect to the text and image content facets and facet attributes in one embodiment as discussed above in act A18.

At an act A22, a user input is accessed. In one embodiment, the user input is a text search and contains one or more item of text of interest to be searched.

At an act A24, the results are modified according to the accessed user input. For example, the results may be modified to only include text objects and image objects which included or are associated with the one or more item of text of interest which was searched. The modified results may be displayed.

At an act A26, it is determined whether the user wants to perform additional searching, such as additional text searching. The method returns to act A22 if additional searching is to be performed. Otherwise, the method proceeds to an act A28.

At act A28, it is determined whether a user has made a selection, such as selection of a facet or facet attribute. If not, the modified search results of act A24 may be displayed. If a selection has been made, the process proceeds to an act A30.

At act A30, the method displays the selected results. For example, if the user selected a certain facet or facet attribute in act A28, then the image objects and text items which are associated with the selected facet or facet attribute are displayed.

New or other searches may also be performed and interacted with, for example, using other text terms and/or other facets or facet attributes.

Creating facets and facet attributes based on metadata may be useful to analysts. However, sometimes metadata may be incomplete or missing altogether, and when spanning multiple media types, there may not be metadata available to make the connection. For instance, there is no metadata field available for making the connection that a picture of an apple and the text "apple" refer to the same thing as discussed above with respect to the example of FIGS. 3-3D. That connection was enabled by the parent-child-sibling relationship discussed above. In particular, the connection between the images of apples that were accompanied by text containing the word "apple" and those images that were not was enabled by computing the visual similarity between the two sets of images as discussed above. The example search systems and methods according to one embodiment may allow analysts to bring the data together in a meaningful way, allowing analysts to exploit the advantages provided by having both metadata facets for multiple media types and content based facets for images within a single tool.

Example apparatus and methods of the disclosure facilitate insight into multimedia information independent of media-type. Providing facets derived from multiple data types display relationships among data that may otherwise be difficult to find. If these types were not combined, a user may have to analyze the data with multiple tools and may have to make the cognitive connection of the relationships among the data independently. By presenting analytics built for each data type within the same faceted view, the methods and apparatus of the disclosure are able to assist in bridging those cognitive connections, both by presenting an interface where the analyst can create the connections themselves, but also by discovering those relationships and presenting them to the user. Data exploration is greatly improved with some embodiments of apparatus and methods of the present disclosure which enable analysts to filter a data collection based on known criteria such as metadata and characteristics that can be discovered computationally such as visual similarity and classification of images and video.

In compliance with the statute, the subject matter disclosed herein has been described in language more or less specific as to structural and methodical features. It is to be understood, however, that the claims are not limited to the specific features shown and described, since the means herein disclosed comprise example embodiments. The claims are thus to be afforded full scope as literally worded, and to be appropriately interpreted in accordance with the doctrine of equivalents.

What is claimed is:

1. A search system comprising:
a communications interface configured to access a plurality of data items of a collection, wherein the data items include a plurality of image objects individually comprising image data utilized to generate an image of the respective data item;
processing circuitry coupled with the communications interface and configured to process the image data of the data items of the collection to identify a plurality of image content facets which are indicative of image content contained within the images and to associate the image objects with the image content facets;
a display coupled with the processing circuitry and configured to depict the image objects associated with the image content facets; and
wherein at least some of the data items individually include text regarding the image object of the respective data item, and wherein the processing circuitry is configured to associate the image object of one of the at least some data items with one of the image content facets as a result of the text of the one of the at least some data items including text of a search of a user.

2. The system of claim 1 wherein the processing circuitry is configured to process the text objects to identify a plurality of text facets which are indicative of content of the text contained within the at least some data items.

3. The system of claim 2 wherein the processing circuitry is configured to associate the text of the at least some data items with respective ones of the text facets.

4. The system of claim 1 wherein the text includes metadata regarding the image data of the image objects of respective ones of the at least some data items.

5. The system of claim 1 wherein the processing circuitry is configured to access a user input which selects some of the identified image content facets and to associate the image objects with only the selected some of the identified image content facets.

6. The system of claim 1 wherein the processing circuitry is configured to use the image object of the one of the at least some data items to identify an image object of another data item which is visually similar to the image object of the one of the at least some data items, and to associate the image object of the another data item with the one of the image content facets after the identification of the image object of the another data item.

7. The system of claim 1 wherein the processing circuitry is configured to associate one of the image objects with another of the image content facets as a result of the one image object being visually similar to another of the image objects.

8. The system of claim 1 wherein the processing circuitry is configured to associate at least some of the image objects with another of the image content facets which pertains to a feature of the image objects other than color.

9. A computer-implemented search method comprising:
   accessing a plurality of data items which comprise a plurality of image objects, wherein at least some of the data items individually include text regarding the image object of the respective data item;
   accessing a user input;
   selecting some of the image objects as a result of the user input;
   selecting others of the image objects which are visually similar to the selected some of the image objects;
   associating the some and others of the image objects with a plurality of facets;
   associating the image object of one of the at least some data items with one of the facets as a result of the text of the one of the at least some data items including text of a search of a user; and
   displaying the some and others of the image objects and the image object of the one of the at least some data items associated with the facets.

10. The method of claim 9 further comprising associating the text with the facets, and wherein the displaying comprises displaying the text associated with the facets and the selected some and others of the image objects.

11. The method of claim 9 further comprising processing the data items to determine the facets.

12. The method of claim 9 wherein the selecting others of the image objects comprises automatically selecting using processing circuitry and in the absence of user input which selects the others of the image objects.

13. The method of claim 9 wherein the selecting others of the image objects comprises selecting as a result of processing the image data of the others of the image objects.

* * * * *

UNITED STATES PATENT AND TRADEMARK OFFICE
CERTIFICATE OF CORRECTION

PATENT NO. : 9,588,989 B2
APPLICATION NO. : 14/977452
DATED : March 7, 2017
INVENTOR(S) : Deborah A. Payne et al.

It is certified that error appears in the above-identified patent and that said Letters Patent is hereby corrected as shown below:

On the Title Page

Item [56], Replace "2011/0125764 A1 5/2011 Carmen et al." with --2011/0125764 A1 5/2011 Carmel et al.--

In the Specification

Column 2, Line 9 - Replace "additional below." with --additional detail below.--

In the Claims

Column 10, Line 51 Claim 2 - Replace "text objects to" with --text to--

Signed and Sealed this
Thirteenth Day of March, 2018

Andrei Iancu
*Director of the United States Patent and Trademark Office*